Patented May 26, 1936

2,041,754

UNITED STATES PATENT OFFICE 2,041,754

PROCESS OF TREATING HYDROCARBON OIL

Wright W. Gary, Great Neck, N. Y.

No Drawing. Application January 8, 1934,
Serial No. 705,820

11 Claims. (Cl. 196—40)

This invention relates to the treatment of hydrocarbon oils for the removal of undesirable constituents therefrom, such as gums, resins, sulfur compounds and the like, by means of a new and improved reagent which has previously been disclosed in my copending application Serial No. 360,601 filed May 4, 1929, of which this is in part a continuation. The new and improved reagent embodied in this invention comprises a mixture of sulfuric acid and a reagent or substance which is substantially soluble in such acid.

In the treatment of petroleum oils, such as distillates including cracked gasoline-like products, lubricating fractions and distillates of intermediate boiling range, with sulfuric acid of varying strengths, the acid exerts an absorptive action upon certain desirable constituents within the oil under treatment, thereby removing them from the treated petroleum and causing loss of refined product. Also the sulfuric acid exerts an undesirable effect upon the petroleum oil to cause polymerization.

I have discovered that in the treatment of petroleum treating losses experienced with sulfuric acid can be greatly reduced, if not practically eliminated by the use of the reagent of the present invention, such reagent promoting equivalent refinement of the oil as would sulfuric acid.

The general practice in the refining of petroleum with sulfuric acid is to contact the oil with the acid by various means and at temperatures from below zero degrees Fahrenheit to greatly above normal. In all cases after the oil under treatment and acid have been contacted and are then made relatively quiescent, the mixture separates into two liquid phases, one comprising treated oil and the other acid sludge. The sludge being heavier than the treated oil settles to the bottom of the apparatus used and is withdrawn therefrom.

The acid sludge which is withdrawn from the treatment is a solution of acid and water insoluble organic substances such as, unsaturated compounds, higher alcohols, aromatics, and the like, these particular organic substances having been absorbed by the acid from the petroleum under treatment. The substances contained in the acid sludge may be separated therefrom by dilution of the sludge with a substantial quantity of water, or the like, whereupon they rise to the top as a supernatant liquid and are decanted. This recovered liquid is the reagent used in the process of the present invention and constitutes substantially all of the water insoluble organic substances absorbed in the acid sludge, and has entirely different chemical properties than acidulated oil which may have been physically admixed with the acid sludge, for example by emulsification or entrainment therewith. For the purpose of convenience these recovered water insoluble substances will be hereinafter referred to as the "sludge reagent." "Sludge reagent" has sometimes also been called "sludge oil."

I have discovered that when this sludge reagent is mixed or substantially absorbed in sulfuric acid and used as the oil refining reagent instead of sulfuric acid alone, all the benefits of the latter are derived, but the treating losses are diminished if not wholly eliminated, as well as decreasing the effect of polymerization. It is preferred to preliminarily admix the sulfuric acid and the sludge reagent before the application of either the acid or the reagent to the oil to be treated.

More specifically, the process may be accomplished in the following manner. The sludge reagent to be used is preferably desiccated by any desired method, a simple usually satisfactory procedure being to allow it to dry by standing in storage. A predetermined quantity of the dry sludge reagent is added to a requisite amount of concentrated sulfuric acid. The sludge reagent is substantially absorbed by the acid, such absorption being accompanied by the evolution of heat. The heated mixture is then preferably cooled by interchange or immediately used for treatment. The mixture of the sludge reagent and acid constitute the refining reagent. The petroleum treating operation is then conducted as with sulfuric acid alone, according to the individual practices of the refiner.

After the oil under treatment has been contacted with the refining reagent, it is allowed to settle and sludge is withdrawn from the apparatus. The treated oil, in certain cases, is then contacted with a small quantity of concentrated sulfuric acid, classified as a "clean up" acid. The sludge from this "clean up" acid treatment is then settled from the treated oil, drained from the system and preferably composited with the sludge derived from the primary step wherein the previously described refining reagent was used. This "clean up" acid is not always required and is included in this specification as a possible or additional step of the process. The final neutralization, washing, or final finishing of the treated oil is conducted as practiced by the refiner when treating with sulfuric acid alone.

The mechanism of the process may be further described as follows: The sludge reagent when absorbed by concentrated sulfuric acid satisfies the absorptive characteristics of the acid to the extent that when contacted with the oil to be treated, the acid exerts more exclusively a chemical effect upon the oil rather than an absorptive effect. With this diminished absorptive effect of the acid, a substantial quantity of the desired constituents of the oil under treatment is preserved in the treated oil phase, which otherwise would have been removed or destroyed, and thus results in a greater yield of refined product. The chemical refining action of the acid is not impaired by the presence of the sludge reagent, and therefore the degree of refinement is equivalent to that of a similar quantity of concentrated acid.

Further, polymerization of petroleum is caused by the chemical combining of the unsaturate constituents of such petroleum. The degree of polymerization is a direct function of unsaturate concentration according to the laws of "mass action" known in the art of chemistry. When unsaturates are absorbed selectively by substantial quantities of sulfuric acid, their relative concentration is greatly increased within the acid as compared with that within the oil under treatment. Therefore by retaining the unsaturates within the oil phase, polymerization is retarded and diminished. This constitutes an additional benefit of the process.

Thus when the process of the present invention is employed for the treatment of gasoline-like products obtained by cracking, and containing aromatics and unsaturates, the loss of such aromatics and unsaturates is only a small fraction of the loss which would be realized were such gasoline-like products subjected to the ordinary acid refining treatment. This saving in the treated oil of the aromatics and unsaturates is extremely desirable since these substances have valuable non-detonating properties when the treated oil is used as motor fuel.

Another added advantage in the use of sludge reagent in the treating of petroleum with sulfuric acid, especially when the untreated oil has a high unsaturated content, is that the heat of reaction of the treatment is lessened or retarded, eliminating the "burning effect" on the treated petroleum, decreasing evaporation losses in treatment, and also retarding the action of the acid to act more effectively upon the undesirable compounds contained in the oil under treatment. This is particularly true in the case of treating a cracked distillate with fuming or concentrated sulfuric acid.

The temperature of treatment may be at any point within the fluidity range of the oil to be treated. In the treating of lighter lower boiling distillates it may be found advantageous to treat at temperatures below zero, and with heavier and more viscous oils, at temperatures above normal. The temperature of treatment will, therefore, depend upon the nature of the oil to be treated and at what temperatures the best results are obtained.

The sludge reagent used in the treatment can be reclaimed after treatment from the acid sludge for use in subsequent treats giving a perpetual supply. In fact, in some cases after having used the same sludge reagent in several successive treatments, it has been found to be a superior treating agent, for the fact that it has become practically immune to any action of the sulfuric acid, allowing the acid to exert its maximum effect upon the oil being treated for the removal or conversion of its undesirable compounds.

It may be found advantageous in the treatment of some oils to use the sludge reagent obtained from treatments of other oils. For instance, in the case of treating a low boiling distillate, such as gasoline or kerosene, a sludge reagent from a higher boiling distillate, such as, a gas oil or a lubricant stock, may be used, ensuring upon redistillation no content of sludge reagent stock, in the finished treated product. In this way the amount of sludge reagent used in the treatment can be increased above normal, the unabsorbed sludge reagent remaining in the still bottoms upon distillation. But generally it is found that the sludge reagent from a specific oil treated, is higher in boiling point, or range than the original and accommodates this feature automatically. But in event a wider difference of boiling range is desired the sludge reagent from higher boiling oil treatments may be used.

The sludge reagent when normally reclaimed from the acid sludge by dilution with water is acid in reaction, or may cause emulsions with water entailing losses to the refiner. Therefore, in such cases the sludge reagent may be obtained by neutralization of the acid sludge, or diluted acid sludge, with alkaline material such as caustic soda, soda ash or lime. However, from a standpoint of re-use it is not detrimental to use an acid reacting sludge reagent, but it may be found of advantage to neutralize, as for instance, to decrease corrosion in storing in metal tanks, drying, etc.

Also it is not imperative to the process to dry the sludge reagent from its water content before use, but from an economic standpoint it is of advantage to minimize the subsequent acid dilution due to the water content of the sludge reagent.

The following two treatments upon the same raw cracked distillate having a sulfur content of 0.27% are cited to illustrate the increased treated oil yield resulting from (1) use of this process as compared with (2) treatment with acid alone.

|  | (1) | (2) |
|---|---|---|
| Quantity of acid used/bbl | 15 lbs. | 15 lbs. |
| Quantity of sludge reagent in acid (percent oil volume) | 3.6 % | 0 % |
| Treated oil recovered | 99.7 % | 96.4 % |
| Sulfur content of treated oil | 0.07% | 0.07% |
| Color (Saybolt) treated oil | 30 | 30 |
| Increased yield by process | 3.3 % | --------- |

It has been found when treating unstable cracked distillates by the process that superior gum removal is accomplished for a given quantity of acid used, and also that distillate bottoms from redistilling the treated oil is superior in quality to that where usual acid treating is conducted.

The process of the present invention may be employed for the treatment of hydrocarbon oils derived from coal tar, for example, benzine, xylene, anthracene and the like. The reagent used in combination with sulfuric acid for treating these particular oils may be derived from the sludge formed in the previous treatment of such coal tar oils or may comprise a reagent derived from acid sludge formed in the treatment of petroleum oils and recovered as hereinabove set forth.

Having thus described the invention, what is claimed is:

1. In the art of refining hydrocarbon oils by means of sulfuric acid for the removal of sulfur, gums, improvement of color, and the like, the step which comprises subjecting such oil to treatment with a mixture of sulfuric acid and a reagent comprising those water insoluble organic substances of the type which are dissolved in acid sludge obtained by treatment of another quantity of hydrocarbon oil with sulfuric acid and which have been separated or expressed from said acid sludge by the addition thereto of a substantial quantity of water.

2. In the art of refining hydrocarbon oils by means of sulfuric acid for the removal of sulfur, gums, improvement of color, and the like, the step which comprises subjecting such oil to treatment with a mixture of sulfuric acid and a reagent comprising water insoluble organic substances which are normally dissolved in acid sludge obtained by treatment of another quantity of hydrocarbon oil with sulfuric acid, and which are derived from said sludge by the addition thereto of a substantial quantity of water.

3. In the art of refining hydrocarbon oils by means of sulfuric acid for the removal of sulfur, gums, improvement of color, and the like, the step which comprises subjecting such oil to treatment with a mixture of sulfuric acid and a reagent comprising water insoluble organic substances derived from acid sludge obtained by treatment of another quantity of hydrocarbon oil with a mixture of sulfuric acid and a reagent comprising water insoluble organic substances derived from acid sludge, said reagent comprising those substances which are normally dissolved in said acid sludge and which have been separated therefrom by the addition thereto of a substantial quantity of water.

4. In the art of refining petroleum oils by means of sulfuric acid for the removal of sulfur, gums, improvement of color and the like, the step which comprises subjecting such petroleum oil to treatment with a mixture of sulfuric acid and a reagent comprising water insoluble organic substances derived from acid sludge obtained by treatment of another quantity of petroleum oil with sulfuric acid, said reagent comprising those substances which are normally dissolved in said acid sludge and which have been separated therefrom by the addition thereto of a substantial quantity of water.

5. In the art of refining cracked petroleum distillates by means of sulfuric acid for the removal of sulfur, gums, improvement of color, and the like, the step which comprises subjecting such cracked petroleum distillate to treatment with a mixture of sulfuric acid and a reagent comprising water insoluble organic substances derived from acid sludge obtained by treatment of another quantity of hydrocarbon oil with sulfuric acid, said reagent comprising those substances which are normally dissolved in said acid sludge and which have been separated therefrom by the addition thereto of a substantial quantity of water.

6. In the art of refining cracked petroleum distillates by means of sulfuric acid for the removal of sulfur, gums, improvement of color, and the like, the step which comprises subjecting such cracked petroleum distillates to treatment with a mixture of sulfuric acid and a reagent comprising water insoluble organic substances derived from acid sludge obtained from previous treatments of another quantity of cracked petroleum distillate with sulfuric acid, said reagent comprising those substances which are normally dissolved in said acid sludge and which have been separated therefrom by the addition thereto of a substantial quantity of water.

7. In the art of refining cracked gasoline-like products containing unsaturated substances by means of sulfuric acid for the removal of sulfur, gums, improvement of color, and the like, the step which comprises subjecting such cracked gasoline-like products to treatment with a mixture of sulfuric acid and a reagent comprising water insoluble organic substances derived from acid sludge obtained from a similar previous treatment, of another quantity of cracked hydrocarbon oil, said reagent comprising those substances which are normally dissolved in said acid sludge and which have been separated therefrom by the addition thereto of a substantial quantity of water.

8. In the art of refining hydrocarbon oils by means of sulfuric acid, the step which comprises subjecting such hydrocarbon oil to treatment with a mixture of sulfuric acid and a reagent comprising water insoluble organic substances derived from acid sludge, obtained from a similar treatment of another quantity of hydrocarbon oil, said reagent comprising those substances which are normally dissolved in said acid sludge and which have been separated therefrom by the addition thereto of a substantial quantity of water, and following such step with a treatment with sulfuric acid.

9. In the art of refining hydrocarbon oils by means of sulfuric acid, the step which comprises subjecting such hydrocarbon oil to treatment with a mixture of sulfuric acid and a reagent comprising water insoluble organic substances derived from acid sludge, obtained from a similar treatment of another quantity of hydrocarbon oil, said reagent comprising those substances which are normally dissolved in said acid sludge and which have been separated therefrom by the addition thereto of a substantial quantity of water, and following such step with a treatment with sulfuric acid, compositing the acid sludges from both steps and recovering from the acid sludges the said reagent for use in other similar treatments.

10. The method of refining hydrocarbon oils by means of sulphuric acid for the removal of sulphur, gums, improvement in color and the like, which comprises admixing acid sludge formed by previous refining treatment of another quantity of hydrocarbon oil with sulphuric acid, with a quantity of water sufficient to separate the sludge into two principal components, one of which comprises mainly weak acid and the other of which comprises those water insoluble organic substances which are normally dissolved in the said acid sludge, separately recovering the latter component and adding it to fresh sulphuric acid, and thereafter utilizing the resulting mixture of said acid and said separated component to treat the hydrocarbon oil to be treated.

11. The method of refining cracked petroleum distillates by means of sulphuric acid for the removal of sulphur, gums, improvement of color, and the like, which comprises admixing acid sludge, formed by previous refining treatment of another quantity of cracked petroleum distillate with sulphuric acid, with a quantity of water sufficient to separate the sludge into two principal components, one of which comprises mainly weak acid and the other of which comprises those water insoluble organic substances which are normally dissolved in the said acid sludge, separately recovering the latter component and adding it to fresh sulphuric acid, and thereafter utilizing the resulting mixture of said acid and said separated component to treat the cracked petroleum distillate to be treated.

WRIGHT W. GARY.